United States Patent
Jen et al.

(10) Patent No.: US 10,172,020 B2
(45) Date of Patent: Jan. 1, 2019

(54) SYSTEMS AND METHODS FOR NETWORKING AND WIRELESSLY ROUTING COMMUNICATIONS

(71) Applicant: Common Networks, Inc., San Francisco, CA (US)

(72) Inventors: Mark Jen, San Francisco, CA (US); Zachary Brock, San Francisco, CA (US); Amrik Kochhar, San Francisco, CA (US)

(73) Assignee: Common Networks, Inc., San Francisco, CA (US)

(*) Notice: Subject to any disclaimer, the term of this patent is extended or adjusted under 35 U.S.C. 154(b) by 0 days.

(21) Appl. No.: 15/937,707

(22) Filed: Mar. 27, 2018

(65) Prior Publication Data
US 2018/0295529 A1    Oct. 11, 2018

Related U.S. Application Data

(60) Provisional application No. 62/482,400, filed on Apr. 6, 2017, provisional application No. 62/616,628, filed on Jan. 12, 2018.

(51) Int. Cl.
*H04W 80/04* (2009.01)
*H04W 24/02* (2009.01)
(Continued)

(52) U.S. Cl.
CPC ......... *H04W 24/02* (2013.01); *H04L 49/3009* (2013.01); *H04W 24/04* (2013.01);
(Continued)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

| | | | |
|---|---|---|---|
| 5,940,372 | A | 8/1999 | Bertin et al. |
| 6,604,146 | B1 | 8/2003 | Rempe et al. |

(Continued)

FOREIGN PATENT DOCUMENTS

| | | |
|---|---|---|
| CN | 102523162 B | 2/2015 |
| WO | 2016111837 | 7/2016 |

OTHER PUBLICATIONS

International Search Report and Written Opinion for International Application No. PCT/US18/24656 dated Jun. 25, 2018.

*Primary Examiner* — Hassan A Phillips
*Assistant Examiner* — Prenell P Jones
(74) *Attorney, Agent, or Firm* — Jeffrey Schox

(57) ABSTRACT

Systems and methods include [i] identifying operational attributes of the mesh radio network; [ii] identifying an Internet communication request originating from at least one of the plurality of network communication devices or identifying an Internet communication response originating from the one or more Internet sources; [iii] generating an Internet communication routing table for the mesh radio network; [iv] transmitting the Internet communication routing table to the mesh radio network; and [v] in response to identifying the Internet communication requests, selecting an optimal communications routing path for the Internet communication request or the Internet communication response based on the Internet communication routing table.

20 Claims, 5 Drawing Sheets

(51) Int. Cl.
*H04W 28/16* (2009.01)
*H04L 12/935* (2013.01)
*H04W 24/04* (2009.01)
*H04W 40/02* (2009.01)
*H04W 24/06* (2009.01)
*H04W 24/10* (2009.01)
*H04W 40/24* (2009.01)

(52) U.S. Cl.
CPC ........... *H04W 24/06* (2013.01); *H04W 24/10* (2013.01); *H04W 28/16* (2013.01); *H04W 40/02* (2013.01); *H04W 40/248* (2013.01)

(56) References Cited

U.S. PATENT DOCUMENTS

| | | |
|---|---|---|
| 2003/0156549 A1 | 8/2003 | Binder et al. |
| 2009/0285124 A1 | 11/2009 | Aguirre et al. |
| 2012/0307663 A1 | 12/2012 | Kwak |
| 2014/0160925 A1 | 6/2014 | Xu et al. |
| 2014/0185454 A1 | 7/2014 | Bellur et al. |
| 2016/0134468 A1* | 5/2016 | Hui ................ H04W 40/32 709/224 |
| 2016/0142252 A1* | 5/2016 | Garg ............... H04L 41/0806 455/424 |
| 2016/0252355 A1* | 9/2016 | Mays ............... G01C 21/206 701/533 |
| 2016/0366096 A1* | 12/2016 | Gilde ............... H04L 63/0281 |
| 2017/0142086 A1* | 5/2017 | Chen ................ H04L 63/08 |

* cited by examiner

Identifying Operational Attributes of Radio Links S310

Generating a Routing Score for each Link S320

Generating Scored Routing Graph S330

Computing Optimal Routing for each Node S340

FIGURE 3

Identifying Radio Links S410

Measuring Performance Metrics of Radio Links S420

Ranking the Radio Links S430

Formulating Fastest Routing Paths for Nodes S440

Generating Routing Table for Node Network S450

FIGURE 5

SYSTEMS AND METHODS FOR NETWORKING AND WIRELESSLY ROUTING COMMUNICATIONS

CROSS-REFERENCE TO RELATED APPLICATIONS

This application claims the benefit of U.S. Provisional Application No. 62/482,400, filed 6 Apr. 2017, and U.S. Provisional Application No. 62/616,628, filed on 12 Jan. 2018, which are incorporated in their entireties by this reference.

TECHNICAL FIELD

The inventions of the present application relate generally to communications routing and computer networking, and more specifically to new and useful systems and method for routing Internet communications via radio frequency transmission.

BACKGROUND

Access to the Internet is now a quintessential requirement for many users and businesses. However, access to reliable internet connectivity is not always available to users and businesses, especially those in remote locations. Internet infrastructure including fiber optic infrastructure development is not always a priority for traditional Internet Service Providers (ISPs) and thus, a remotely located user may not have robust access to the Internet due to limited Internet infrastructure and the like.

Thus, there is a need in the communications routing and computer networking field to create new and useful systems and methods for high-speed Internet connectivity.

BRIEF DESCRIPTION OF THE FIGURES

FIG. 3 illustrates a general process flow of a method 300 for optimizing communications routing in a network in accordance with embodiments of the present application;

FIG. 5 illustrates a general process flow of a method 500 for optimizing communications routing in a network in accordance with embodiments of the present application.

DESCRIPTION OF THE PREFERRED EMBODIMENTS

The following description of the embodiments of the present application are not intended to limit the invention to the disclosed embodiments, but rather to enable any person skilled in the art to make and use the inventions described herein.

1. System for Networking and Routing Internet Communications Over Radio

Figure 1:
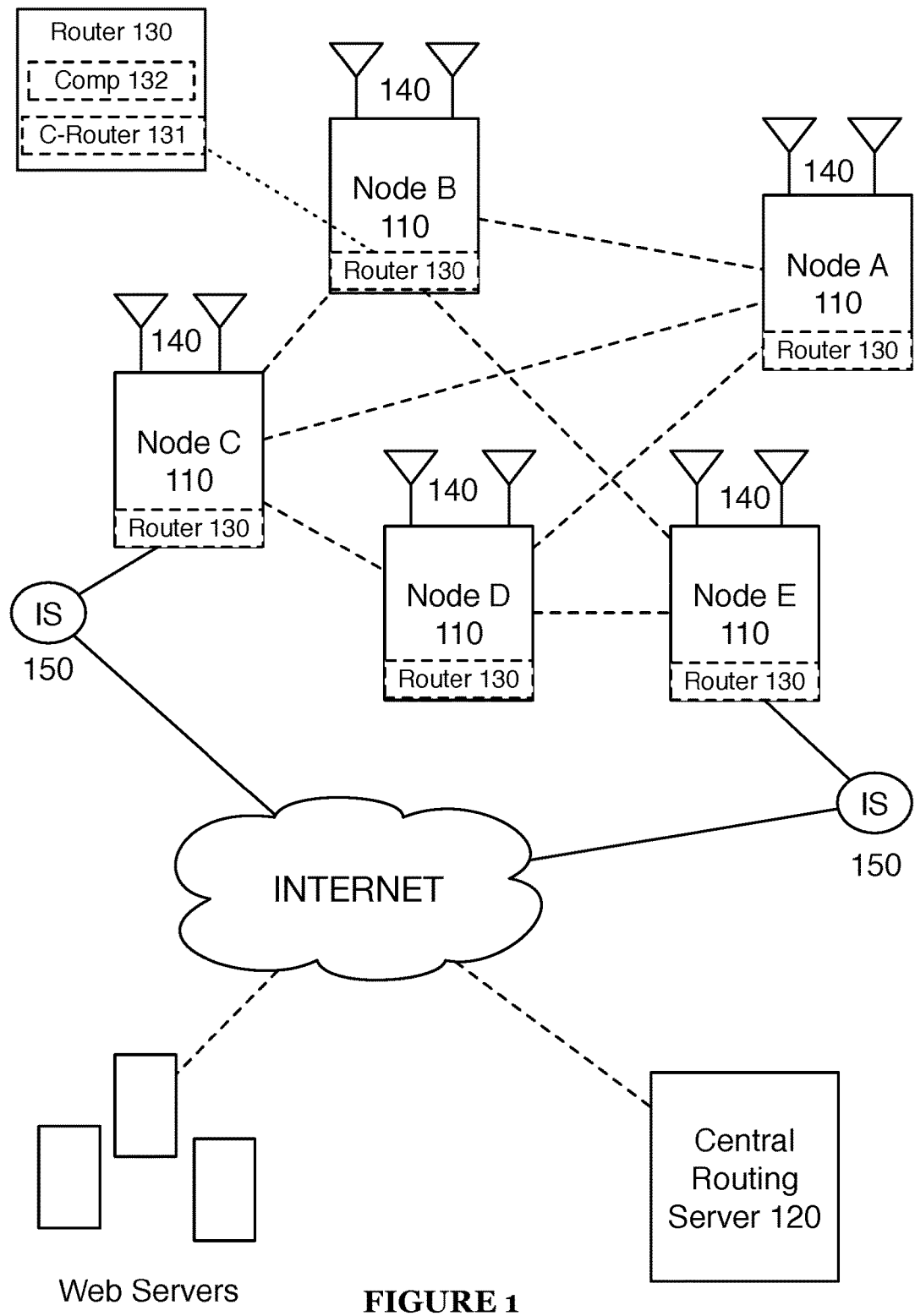
FIG. 1 illustrates a schematic representation of a system 100 for networking and routing communications in accordance with embodiments of the present application.

As shown in FIG. 1, a system 100 for networking and routing Internet communications between a plurality of nodes is illustrated. The system 100 includes a plurality of nodes 110, a central routing server 120, a plurality of routers 130, a plurality of antennae 140, and one or more Internet sources 150. The system 100 functions to enable wireless Internet communications between disparate homes (or nodes) using radio frequency-based communications.

In a preferred embodiment, each of the plurality of nodes 110 is a home, building, or other structure that is disparate and/or geographically remote from another structure forming one of the plurality of nodes 110. In some embodiments, each of the homes forming a node may not be geographically remote from another structure (e.g., townhomes, multi-family units, multi-tenant units, etc.), but still may be distinct in terms of the radio-based communication installed at the location of the structure. For instance, a group of the plurality of homes may represent a group of townhomes that are generally connected to one another but each of the townhomes in the group may be owned or managed by a disparate entity and similarly, each townhome may maintain its own radio-based communication system. Each node may be geographically remote in terms of distance between each other. In this sense, the nodes may be spaced apart in the range of a few feet to possibly a few miles; however, in many instances, the nodes may be 5 feet to 300 feet away from each other, which is typically the distance of homes in a specific neighborhood. Thus, the plurality of nodes 110 may represent all of the homes in a specific neighborhood, which are connected via the system 100 and forming a geographically defined mesh network or the like.

Additionally, or alternatively, the plurality of nodes 110 may be a combination of different types of entities requiring Internet communications to be routed between them. For instance, the plurality of nodes 110 may be include homes, buildings, vehicles, electronic devices, computing devices, and the like in a specific geographic region. This combination of devices may be connected via the system 100 to network and route Internet communications between them. Effectively, the plurality of nodes 110, preferably, form a mesh network with the ability to network with one or more neighboring nodes within the mesh to route or pass communications from an initiating node to a destination node and possibly, onward to a larger communication network (e.g., WAN, Internet, etc.).

Generally, the plurality of nodes 110 are configured to communicate with each other wirelessly using radio frequency communications. However, it shall be noted that the plurality of nodes may implement a combination of communication schemes or systems to effectively communicate and/or route communication packets between them including any short-range communication system (e.g., Bluetooth) and/or long-range communication systems (e.g., long-range radio chips, Internet, etc.).

The central routing server 120 functions as a central authority for monitoring the network formed by a plurality of nodes 110 and for controlling the operation of each of the plurality of routers 130 and each of the plurality of antennae 140 at each of the plurality of nodes. Additionally, or alternatively, the central routing server 120 may be hosted on a cloud-based system or distributed computing system. Additionally, or alternatively, the central routing server 120 may include several servers operably connected with each other and operably connected to the network formed by the plurality of nodes 110. Preferably, the central routing server 120 is geographically remote from the plurality of nodes 110; however, there may be one or more centrally controlled servers at or near one or more of the plurality of nodes 110 and usually, near or at an Internet source 150 for purposes of encrypting and decrypting data being transmitted between each of the plurality of nodes.

The central routing server 120 also functions to collect data from each of the plurality of nodes 110. Specifically, the central routing server 120 may be in operable communication with each of the plurality of routers 130 and each of the plurality of antennae 140. The plurality of routers 130 and antennae 140 may periodically record data and/or generate data which the routers 130 and the antennae 140 transmit (e.g., via the Internet or the like) back to the central routing server 120. The recorded and/or generated data may include any data regarding an attribute of the communications being transmitted between the plurality of nodes 110 and, may include, but is not limited to, data regarding operational attributes of each of the nodes (e.g., operations of each router and/or set of antennae at a node), and/or data relating to operational attributes of radio communication links between pairs of linked nodes.

The central routing server 120 may use the communications and operational data collected from the routers 130 and/or antennae 140 to determine routing paths for current and/or future communications. Specifically, the central routing server 120 may generate one or more communications routing tables that include communications routing paths specific to each node of the plurality of nodes 100 that indicates the specific radio links or chain of links that a communication originating at a source node or Internet source will travel to arrive at its destination. For instance, in a mesh network formed by a plurality of nodes that includes nodes A-E and an Internet source (e.g., destination of communications from nodes A-E), the routing table generated by the central routing server 120 may provide that a communication initiated from node A travels the path A to C to E to Internet source and that a communication initiated at node D travels the path D to A to E to Internet source. Thus, the routing table defines a communications routing path for each of the nodes for transmitting a communication initiating from a specific node to the Internet source and vice versa (e.g., from the Internet source to a specific node) and/or between a source node and a destination node of the mesh radio network.

The routing tables generated by the central routing server 120 may be updated periodically (e.g., every few [2-10 ms] milliseconds to every 10 minutes or so). The routing tables may be updated as frequently as new data is collected from the nodes, such that a significant data update from the nodes may trigger the central routing server 120 to automatically update the routing tables and transmit the updated routing tables to the nodes, especially when it is recognized by the central routing server 120 that one or more nodes may not be operational or functioning properly or the like (e.g., a node is down).

Additionally, or alternatively, a communications routing table may be generated and/or updated based on a detection of a new radio node coming online within the mesh radio network of radio nodes and pushed through the mesh radio network by the central routing server 120 or the like. In such embodiments, the central routing server 120 may receive a signal from the new radio and/or a neighboring radio indicating that the new radio is active and seeking a communications routing table and/or seeking establishment as an active radio node for routing communications within the mesh radio network. Accordingly, upon detection of the new radio, the central routing server 120 may function to identifying patenting routing paths involving the new radio including optimal routing paths and optimal radio links involving the new radio node and additionally, generate a new communications routing table that includes communication paths with the new radio node.

Once the routing tables are generated by the central routing server 120, the central routing server 120 may transmit the generated routing tables to one or more nodes in a networked set of nodes. The nodes receiving the routing tables may then propagate the routing tables to each of its neighboring nodes until all or nearly all of the nodes in the networked set of nodes has the most up-to-date routing tables (i.e., a routing table having latest timestamp data). Additionally, or alternatively, the one or more nodes receiving the up-to-date routing tables may function to selectively propagate the routing tables to optimally positioned nodes within the mesh radio network that enables the most efficient dissemination of the up-to-date routing tables. The one or more optimally positioned nodes may be identified by the central routing server based on one or more of identifying nodes with connections to a number of nodes exceeding a connection threshold and identifying nodes with communication performance satisfying a performance threshold. The central routing server 120 may function to augment the routing able with data regarding the identified one or more optimal nodes within the mesh radio network.

Additionally, or alternatively, each of the nodes in the networked set of nodes may continually or periodically ping neighboring nodes to determine whether there are new routing tables available and, in that way, the routing tables may be pulled through the system by the requesting nodes rather than pushed through the system by the receiving nodes or the central routing server.

Additionally, the central routing server 120 monitors each of the radio links between connected nodes in a networked set of nodes. Specifically, the central routing server 120 may use the data collected from each of the nodes via the routers 130 and antennae 140 to identify attributes of the radio links between connected nodes. For instance, the central routing server 120 is able to monitor and/or identify a signal strength of a radio link, the utilization of a radio link, the capacity of a radio link, the bandwidth of a radio link, the throughput of a radio link, disconnectivity of a radio link, and the like. Based on the monitoring information, the central routing server 120 is able to determine routing instructions and routing tables. For instance, if the central routing server 120 identifies that a node in a networked set of nodes is malfunctioning and thereby cannot pass communications between nodes, the central routing server 120 may generate a new routing table that avoids making the malfunctioning node a transmitting node (e.g., an intermediary node transmitting communications between an initiating node and a destination node). Additionally, or alternatively, based on the collected radio link data from the identified radio links within the mesh radio network, the central routing server may function to generate and assign performance grades to each of the radio links within the mesh radio network.

The plurality of routers 130 preferably includes a combination of an internal structure communications router (e.g., Wi-Fi router, transmitter, and receiver, etc.) 131 and a computer 132. The communications router 131 is preferably connected to one or more user devices or other routers within a node and functions to route communications between each of the user devices and/or routers and the Internet. The computer 132 functions to operate communications processing and resident routing software, that when executed by the computer 132, allows the computer 132 to encrypt out-going communications initiated from the node and decrypt incoming communications received by the node. The computer 132 functions to generate operational data that is communicated to the central routing server 120. Additionally, the computer 132 functions to execute all routing functionality for a specific node including identifying and/or requesting new routing tables and the like.

Each node of the plurality of nodes 110, preferably includes a plurality of antennae 140 that may be positioned at an external location of the node. For instance, if the node is a home, the antennae 140 are positioned external to an interior of the home and preferably, are positioned on the home or at a position adjacent or immediately next to the home. The antennae 140 at each node may include one or more antennae (e.g., 1-4 or 1-n antennae) that may be positioned in various directions to establish multiple connections with one or more antennae of disparate nodes. Each of the antennae at a specific node may be used to establish active and potential links with other antennae of neighboring nodes. An active link between antennae of two disparate nodes may representative a communications link determined by a routing table generated by the central routing server 120. A potential link between antennae of two disparate nodes may represent communication links that are not currently in use but may become active links depending on a new routing table.

The Internet sources 150 include media, such as fiber optic cables that are generally fixed in position relatively to a networked set of nodes. Additionally, or alternatively, the Internet sources 150 may include a wireless link (e.g., gigabit+ wireless link) to a datacenter or other intermediary for a backhaul (backbone) connection to the Internet. The Internet sources 150 may include a plurality of Internet access points positioned proximate to one or more nodes of the networked set of nodes. Each of the plurality of Internet access points may be hardwire connected to the one or more nodes within the mesh radio network. At each of the Internet access points may be one or more centrally-controlled servers or computers that are able to decrypt communications and/or data received from a node prior to sending the communications through the fiber optic cables to an Internet server. Additionally, the one or more centrally controlled servers or computers may encrypt communications and/or data from the Internet server prior to forwarding the communication to a destination node. In this way, requests and data communications from a node in a networked set of nodes is kept secure and private from other nodes (e.g., transmitting nodes) in the networked set of nodes.

Figure 2:
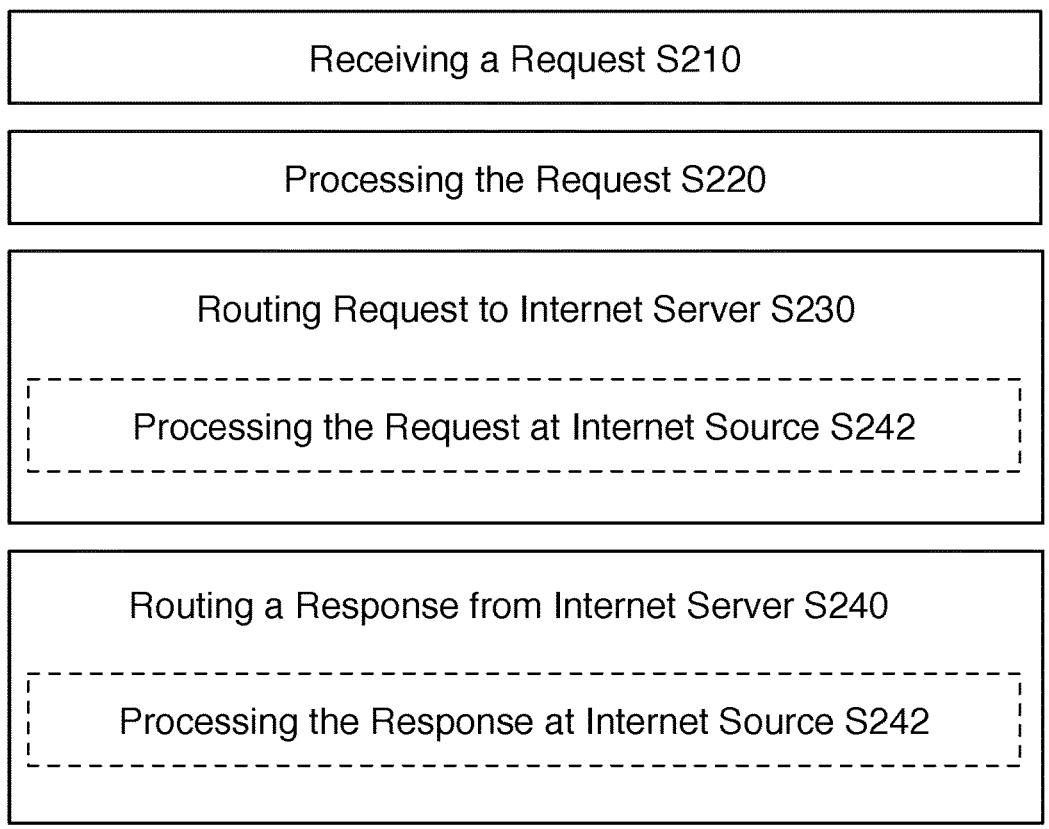
FIG. 2 illustrates a general process flow of a method 200 for networking and routing in accordance with embodiments of the present application.

2. Method for Wirelessly Routing Communications Between a Requesting Node and an Internet Server As shown in FIG. 2, a process flow of a method 100 for wirelessly routing (Internet) communications between a user device and an Internet server and vice versa is illustrated. The method 100 includes receiving a request at a user device S210, processing the request S220, routing the request to an Internet source S230, optionally, processing the request at a computing server at the Internet source S232, routing a response from an Internet server to the user device S240, optionally, processing the response at a server at the Internet source S242.

At step S210, a user using a wireless network (e.g., Wi-Fi) generated at the node may initiate a request using a user device (e.g., any computing device or the like). The request initiated by the user generally includes an identification of a web page, Internet service, Internet information, or Internet application that the user would like to have access or otherwise, create an ongoing TCP connection with, and the like.

The identification of the request by the user may also be used to identify a starting point for calculating latency in processing the request. The calculated latency may be used by a system implementing the method 100 as a measurable metric for improving the response time to a request and generally, the overall performance of the system 100.

At step S220, the request may be received at a routing agent (e.g., firmware or the like) operating on a routing computer at the requesting node. In processing the request, the routing agent may first determine a destination of the request (e.g., a destination Internet server) to determine a routing path for the request. Subsequently, the routing agent may check an associated database or an associated memory for a routing table that identifies one or more routing path for requests originating from the requesting node. Depending on when the routing table was updated last, the routing agent may function to use a routing path identified for the node associated with the request or attempt to determine whether there is an updated or new routing table or routing solution available to be used for routing the request to its Internet destination. In determining whether there is a new routing table or solution, the routing agent may ping or make a request to each of its direct (e.g., direct radio connection, a single radio link connection, etc.) or its indirect (e.g., indirect radio connection, multiple radio link connections, etc.) neighboring nodes. Additionally, or alternatively, pinging the network of nodes may be performed continuously or near continuously by a routing agent or other node controller and data from each of the nodes may be uploaded to the central routing server in response to the pinging. As a result, the central routing server may be able to ingest the uploaded data to determine whether updates to the routing table may be required, update the routing table based on the uploaded information, and push down an updated routing table to the nodes, which in turn is received by routing agents at the nodes. Additionally, or alternatively, the routing table request by the routing agent may include an indication of a date and/or time (timestamp) of the most recent routing table accessible to the routing agent that was received from a neighboring node or generated by a central routing server. In return, the linked or neighboring nodes may either return an updated routing table or may indicate that there has been no newly updated routing table since the routing table currently accessible to the routing agent.

Once a routing path is identified or selected for routing the request, the routing agent may proceed to encrypt data associated with the request and transmit the encrypted request data to a first relay node in the identified routing path. However, if the subject node has a direct path to an Internet source, the routing agent would proceed to transmit the encrypted request data directly to the Internet source S230. Additionally, or alternatively, the routing agent may transmit along with the encrypted request data the current routing table and/or a selected routing path for the encrypted requested data. In this way, the next or relaying node can quickly reference the routing table sent with the encrypted request data rather without having to reference a separate memory unit or the like associated with the relay node that stores the routing table.

At step S230, when the identified routing path for the subject node involves several intermediate transmitting or relaying nodes, the encrypted request data from the initiating node is received and processed at the routing agent at each of the relay nodes. Upon receipt of the encrypted request data, each of the relaying nodes along the identified routing path for the encrypted request data may check the routing table sent along with the transmission to identify the next destination node for the encrypted request data package. However, in some embodiments, the routing agent at the relaying node may also check for any newly available routing tables different from the routing table received with the encrypted request data. In this way, the routing agent at the relay node is able to determine whether a faster route for the encrypted request data has been generated and/or whether any nodes within the original routing path of the encrypted request data have gone offline or malfunctioning such that the nodes are unable to receive or transmit the encrypted data request via the offline and/or malfunctioning node.

At the Internet source, the encrypted request data is decrypted prior to forwarding the request data to the destination Internet server S232.

At step S240, a response to the request is received at the Internet source from the destination Internet server. Additionally, or alternatively, at the Internet source, data associated with the response is encrypted prior to transmitting the response to the initiating node that generated the request S242. Accordingly, after encrypting the response data, the encrypted response data is transmitted via the reverse routing path of the request data. That is, from the Internet source, the encrypted response data is transmitted via the same nodes, albeit in reverse order, through which the request from the initiating node was transmitted.

Additionally, or alternatively, if one or more of the relaying nodes in the reverse routing path is non-operable or malfunctioning or an up-to-date routing table has been made available to a local routing server at the Internet source, the local routing server is able to dynamically change the reverse routing path of the encrypted response data to a new routing path back to the initiating node. If the routing table includes a new routing path for the originating node, the routing server would simply reverse the routing path to determine a new reverse routing path for transmitting the encrypted response data back to the initiating node.

3. Method for Optimizing Communications Routing Solutions Between a Plurality of Nodes As shown in FIG. 3, a process flow of a method 300 for optimizing communications between a plurality of nodes and an Internet source is described. The method 300 includes identifying operational attributes of each radio link in a mesh network formed by the plurality of nodes S310, generating a normalized routing score for each radio link S320, optionally, generating a scored routing graph S330, computing optimal routing for each node to the Internet source S340. The method 300 functions to identify one or more optimal routes for routing Internet communications from each node in a mesh network of nodes to an Internet source.

At step S310, measurable attributes of each radio link between nodes may be collected and analyzed, preferably by a central routing server, based on data provided by each of the respective routing agents operating at the respective nodes. Additionally, measurable attributes of the radio links between nodes may be determined by performing one or more tests on the radio links and, based observations of the radio links by a central routing server or the like.

For instance, in a passive observation mode (e.g., a first mode), the central routing server is able to continually monitor each of the radio links to determine one or more operational attributes (or factors) of the radio links based on usage of the radio links by nodes within a mesh node network. Thus, in the passive observation mode, the central routing server may be able to determine attributes, such as a maximum observed bandwidth at each of the radio links, an average maximum bandwidth (based on trailing data), an average latency of communications requests, and the like.

Based on these passive observations, the central routing server may provide a weight to each of these passively observed values and calculate a normalized routing score for each radio link. For instance, S310 may function to apply a first weight to a maximum observed bandwidth value at a radio link, a second weight to an average maximum bandwidth at a radio link, and a third weight to an average latency value at a radio link. Accordingly, the normalized routing score for a given radio link may be a weighted average value or a weighted summed value of the attributes or factors of a given radio link.

Additionally, or alternatively, the central routing server may implement an active monitoring and measurement process (i.e., an active observation mode) (e.g., a second mode) that involves actively providing loads to the radio links to determine maximum bandwidths, variability, signal strengths, and stability of the radio links, sending test requests from each of the nodes to determine latency from each node to an Internet source, and the like.

Additionally, the central routing server may be able to approximate the total link capacity of a radio link based on a radio link's signal-to-noise ratio. A radio link's signal-to-noise ratio can be used by radios to select an encoding rate and the combination of encoding rate and signal-to-noise ratio can be used by the central routing server to estimate a radio links total capacity; however, this estimation by the central routing server may not take into account varying interference.

Additionally, or alternatively, the central routing server may set various radio frequencies and bandwidths at the nodes, measure a resulting performance of the nodes over one or more periods of time, and utilize the measurement data to determine an optimal frequency and/or bandwidth for each communication link. Additionally, or alternatively, the central routing server may be able to determine an optimal frequency/bandwidth for the entire system of nodes (e.g., specific mesh or family of nodes) rather than only for individual links between the nodes.

Additionally, the central routing server may rank the importance of each of the measured and/or observed attributes of the radio links. For example, in some embodiments, the central routing server may rank total link capacity the highest, such that the total link capacity is weighted more heavily in determining a good radio link for transmitting data. In such example, the central routing server may determine that an average maximum utilized capacity and latency attributes of a radio link should have equal weight, but a lower weight than the total link capacity. Thus, a ranking may be established for several of the attributes of a radio link where the attributes having a greater weight are ranked higher than other attributes with lower weights.

Figure 4:
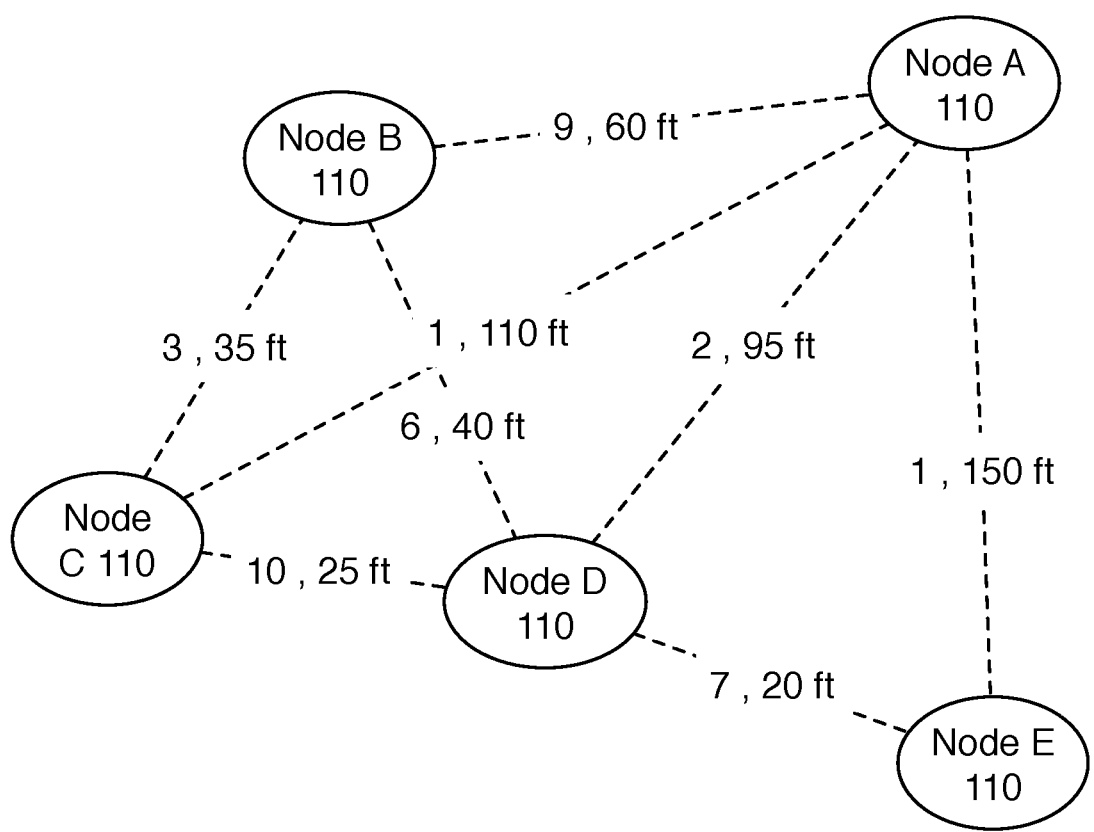
FIG. 4 illustrates a schematic representation of an optimized routing graph in accordance with embodiments of the present application.

At step S320, the observed and/or measured values in the active mode and passive modes may be used to determine a routing score for each of the radio links. As shown in FIG. 4, each radio link between each of pair of nodes is assigned a routing score where the routing score represents a level of capability (performance) of the radio link to route communications. For instance, the routing score may be based on a scale of 1-10 and the higher the routing score value assigned to a radio link indicates that the associated radio link has a better capability to transmit communications. In such instance, the lower the score on the scale for a radio link, the lesser the capability for the associated radio link to transmit communications. It shall be noted that the above scale is only an example of values that can be used for assigning a routing score to a radio link. Any type of values including letter values (e.g., letter grading), numeric values, word values, and the like may be assigned to a radio link to describe a quality or performance of communications transmission of an associated radio link.

Once routing scores are assigned to each of the radio links, each of the radio links may be ranked based on the routing score assigned to each radio link. Thus, radio links having high routing scores may be higher on a ranking list than radio links having low routing scores. The ranking of the radio links may be used in routing path determinations and the like.

In one implementation of S320, S320 may function to assign differentiated performance designations to each node within a mesh radio network based on the observed and/or measured values of the mesh radio network. In such implementation, S320 may function to identify or label one or more nodes within the mesh radio network having a high performance relative to other nodes within the mesh network (i.e., whitelist). Accordingly, a whitelisted node may be a node satisfying a whitelist threshold (e.g., a performance score of 90 or better on a scale of 0-100, grade A site on a scale of A-F, etc.). Additionally, or alternatively, S320 may function to greylist one or more nodes within the mesh radio network having low to moderate performance that fails to satisfy a whitelist threshold and that does not fall below a blacklist threshold. While greylisted nodes may still be available in a scored routing graph and/or considered in a computation of a routing table, a greylisted node may be ranked below nodes having a higher performance designation (e.g., whitelisted nodes). Additionally, or alternatively, S320 may function to identify or label one or more nodes as blacklisted that have a measured or calculated performance below a blacklist threshold. Preferably, blacklisted nodes may be removed (from the scored routing graph) or otherwise eliminated from considering when computing a routing table.

Additionally, each radio link may be assigned a distance value corresponding to a physical distance between a pair of nodes forming a link. The distance value may be a measured and/or an approximate physical distance between the nodes and/or the distances between the external antennae of a pair of nodes having a radio link between them. In this way, the distance between two nodes can also be used as a factor in determining optimal routing paths (e.g., shortest routing paths or the like) between a requesting node and a destination node or Internet source.

At step S330, using the routing scores identifying for each radio link in a mesh network formed by a plurality of nodes, a scored routing graph may be generated which illustrates each of the active and potential links in the mesh network and the routing score assigned to each radio link and/or the distance value assigned to each radio link. As shown in FIG. 4, a single node may have varying routing scores associated therewith depending on another node forming a radio link with that single node. The scored routing table may be dynamically updated by a system implementing the method 300 based on one or more of a detection of a communications routing request from one or more nodes within a mesh radio network, a detection of a communications routing slowdown within the mesh radio network, a detection of a failing or failed node, and the like. Additionally, or alternatively, the scored routing table may be updated on a predetermined schedule (e.g., periodically or continuously at predetermined dates and/or times).

At step S340, using at least the scored routing graph as input, optimal routing paths for each node in a mesh network of nodes may be determined. The data associated with the scored routing graph, such as the routing scores for each radio link may be used as input into a maximum/minimum algorithm or the like (or a shortest-path algorithm where the shortest path algorithm identifies shorter paths as those radio links having higher routing scores). The maximum/minimum algorithm preferably relates to a method for identifying an optimal routing path based on optimizing for maximum available bandwidth along a routing path and optimizing for a minimum total distance from a source of a communication to a destination. Accordingly, the maximum/minimum algorithm functions to balance a need for routing communications through optimally performing (e.g., high available bandwidth, etc.) while minimizing a total distance that communications must travel within a mesh network.

Accordingly, a routing path from a source node to an Internet source (or another node) may be determined based on a routing path having the highest additive routing score values (e.g., 9 [A-B]+6 [B-D]+7 [D-E]=22 routing score) and a lowest summed distance values. In a preferred embodiment, S340 may function to assign weighting values to each of the maximum and minimum factors of the maximum/minimum algorithm thereby differentiating an importance of the maximum available bandwidth factor and the minimal total distance factor.

Additionally, or alternatively, in a simpler model, the distance values, alone, between nodes may be used as input into a shortest-path algorithm to determine routing paths for each node. In such instance, the routing path from a subject node to an Internet source having the lowest additive routing distance values may be identified as a routing path for the subject node.

Additionally, or alternatively, a routing path may be determined based on a combination of the routing scores assigned to each radio link as well as the distance values assigned to each radio link. Thus, a combination routing score and distance value routing path may be determined for each radio link. In such instances, the routing scores and distance values may be weighted different in the combination, such that the routing score or the distance values have greater weight in the combination routing score and distance value routing path.

In a variant of S340, a communications routing table and/or one or more communications routing paths may be generated based on one or more simulations of a plurality of communication requests through one or more optimal routing paths within the mesh radio network. In such embodiments, in response to multiple communication routing requests, a system implementing the method 300 may function to simulate one or more communication data loads to an optimal communication routing path. The one or more communication data loads may be based on a projected load of each of the multiple communication routing requests. In the case that the simulation indicates a meaningful slowdown within the identified optimal communications routing path if the multiple communication routing requests were transmitted through the optimal communications routing path, S340 may function to generate a new routing table and/or new communications routing paths for splitting or dispersing the load among multiple communications routing path. In some embodiments, S340 functions to disperse the multiple communication routing request among, at least, the optimal communications routing path and a sub-optimal communications routing path. A technical benefit achieved by the dispersion includes achieving a combined throughput of the communications routing requests through the combined optimal and sub-optimal routing paths that is greater than the throughput of routing the multiple requests through only the optimal communications routing path.

4. Method for Optimizing Communications Routing Solutions Between a Plurality of Nodes Based on Identifying Fastest Routing Paths In a variation of the method 300, the method 400 functions to determine communication routing paths and/or optimize communications among a plurality of nodes behaving as a mesh network based on identifying a fastest-time path for routing communications from each of the nodes. Like method 300, the method 400 employs a software-defined network routing technique from a central governing authority (e.g., a central server). Thus, avoiding the data-intensive and processing-intensive circumstance in which route path calculation and determination is distributed, in a decentralized manner, among each individual node.

The method 400 includes identifying available links between pairs of nodes in a network of nodes S410, measuring performance metrics of each link S420, ranking each of the available links based on the measured performance metrics S430, formulating a fastest routing path for each node in the network of nodes S440, generating a routing table based on the fastest routing path for each node in the network of nodes S450.

S410, which includes identifying available links between pairs of nodes in a network of nodes, functions to identify all prospective links between any two nodes in a defined network of nodes (e.g., a defined mesh network or network constrained by a geographic region or encircling). Thus, for each node in a defined network, S410 functions to identify a target node and every possible link between the target node and another node in the defined network. For instance, in a small network including only four nodes (e.g., A, B, C, and D), each node will have three possible link (e.g., A-B, A-C, and A-D). In such example, S410 would identify that the small network includes twelve (12) total possible links and specifically, identify each link.

S420, which measuring performance metric of each link, functions to preferably measure attributes of a radio link related speed at which the links transfers data. In this regard, S420 functions to measure the bandwidth for each radio link identified in S410, and especially, measure the throughput for each radio link. S420 may additionally may other attributes of the radio links, such as latency, jitter, error rate, and similar metric indicating radio link performance. Additionally, S420 may store these measured performance values in a historical performance metrics database.

It shall be noted that for any radio link that cannot be discovered or for which there is no activity, S420 may ignore and/or skip that radio link.

S430, which includes ranking each of the radio links, functions to rank each of the radio links based on bandwidth and/or throughput. Specifically, S430 may generate a ranking table or list of all of the available radio links in the defined network based on the measured throughput and/or bandwidth. For instance, each radio link may be ranked from highest throughput to slowest throughput, with the radio links having the highest throughput being at a top of the throughput ranking list. As another example, each radio link may be ranked highest bandwidth to slowest bandwidth, with the radio links having the highest bandwidth being at a top of the bandwidth ranking list. In some embodiments, S430 may calculate a combined ranking list that takes into account bandwidth and throughput metrics for each link. In such embodiments, S430 may allocate a heavier weight for the throughput metrics for each radio link as compared with the weight for bandwidth since the throughput metric is a better metric for determining the actual rate that information is transferred. So, for example, a combined ranking list may weight throughput at 60% and bandwidth at 40%, where only 605 of the throughput value for a radio link is added to 40% of the bandwidth rate for a radio link. The combined ranking list would, thus, rank from fastest combined bit speed to lowest bit speed.

S440, which includes formulating the fastest routing path for each node in a defined network, functions to string together a chain of the fastest radio links for each node to an Internet source. For each node, S440 may generate multiple proposed fastest routing and once generated, S440 may compare each of the proposed fastest routing paths to identify the single fastest routing path (e.g., a path taking the shortest time from the node to destination of a communication from the node) for a subject node.

Additionally, or alternatively, S440 may include fast-filtering poor performing radio links from the radio links that may be considered in the formulation of a proposed fastest route path for a node. For instance, fast-filtering the radio links may include setting a performance threshold for route segments or an overall routing path, possibly based on bit rates, and comparing all links available for a possible route segment to the performance threshold. Thus, any radio link that does not satisfy, exceeds, or falls below the threshold are immediately filtered from a database or list of radio links that can be considered for a proposed fastest route path. Accordingly, fast-filtering the radio links reduces the amount of processing and time required for generating a fastest route path for a subject node.

In one variation, S440 may determine a fastest routing path to route communications from an initiating node to a destination by successively finding a fastest link between pairs of nodes starting from the initiating node through to the destination. While, in some case, this may yield a chain of links, where each link is the fastest available link, the overall time that it takes to transport a communication from the initiating node to the destination may be higher than in which a routing path is optimized to limit the overall time to a smallest value that is required to transport a communication from a node to a destination (e.g., fastest-time path).

S450, which includes generating a routing table based on the identified fastest routing path for each node in the network of nodes, functions to create a data structure that encapsulates each of the determined fastest routing paths for the nodes. In this regard, S450 may generate the routing table, store a copy of the routing table, and also, transmit or push a copy of the routing table to one or more nodes in the network of nodes. Upon receipt by the one or more nodes, the nodes may actively assist in propagating the routing table to other nodes in the network or passively wait until a neighboring node requests an updated routing table.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system 100 and one or more portions of the computer processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various nodes, routing algorithms (e.g., shortest path, fastest-time path, etc.), and the like.

As a person skilled in the art will recognize from the previous detailed description and from the figures and claims, modifications and changes can be made to the preferred embodiments of the invention without departing from the scope of this invention defined in the following claims.

What is claimed is:

1. A system that routes Internet communications data within a mesh network of radio communication devices, the system comprising:
   a plurality of networked radio communication devices defining a mesh radio network;
   one or more Internet sources being operably connected to one or more of the plurality of networked radio communication devices, wherein two or more subsets of the plurality of networked radio communication devices are installed at or near disparate structures;
   a remote central routing computing server that controls Internet communications data routing involving the plurality of networked radio communication devices, wherein controlling Internet communications data routing includes:
   [i] identifying operational attributes of the mesh radio network;
   [ii] identifying an Internet communication request originating from at least one of the plurality of network communication devices or identifying an Internet communication response originating from the one or more Internet sources;
   [iii] generating an Internet communication routing table for the mesh radio network;
   [iv] transmitting the Internet communication routing table to the mesh radio network; and
   [v] in response to identifying the Internet communication requests, identifying an optimal communications routing path for the Internet communication request or the Internet communication response based on the Internet communication routing table;
   wherein:
   identifying operational attributes of the mesh radio network includes collecting operational attributes of the mesh radio network in one of an active mode and a passive mode,
   the passive mode includes acquiring operational attributes data as the one or more of the plurality of networked radio communication devices provide operational attributes data to the central routing server, and
   the active mode includes acquiring operational attributes of the mesh radio network based on applying test loads during a test period to the mesh radio network and collecting operational attributes of the mesh network during the test period.

2. The system of claim 1, wherein
   the operational attributes of each of the radio communications devices includes an offline/online status of each of the radio communication devices within the mesh radio network, wherein a default offline status is assigned to radio communication devices that fail to provide an affirmative offline/online status.

3. The system of claim 1, wherein
   collecting operational attributes of the mesh radio network includes collecting operational attributes of each active radio link between disparate pairs of radio nodes within the mesh radio network.

4. The system of claim 1, wherein
   collecting operational attributes of the mesh radio network includes collecting operational attributes of each of the radio communication devices within the mesh radio network.

5. A method for routing Internet communications data within a mesh network of radio communication devices, the system comprising:
   [i] identifying operational attributes of the mesh radio network;
   [ii] identifying an Internet communication request originating from at least one of the plurality of network communication devices or identifying an Internet communication response originating from the one or more Internet sources;
   [iii] generating an Internet communication routing table for the mesh radio network;
   [iv] transmitting the Internet communication routing table to the mesh radio network; and
   [v] in response to identifying the Internet communication requests, selecting an optimal communications routing path for the Internet communication request or the Internet communication response based on the Internet communication routing table;
   wherein:
   generating the Internet communication routing table includes:
   simulating an Internet communications data load to an optimal communications routing path within the mesh radio network, and
   in response to the simulation, dispersing two or more Internet communications within the mesh radio network to the optimal communications routing path and to a sub-optimal communications routing path.

6. The method of claim 5, wherein
   the Internet communication routing table comprises a plurality of optimal communication paths for routing Internet communications data from a source within the mesh radio network to a destination with the mesh radio network.

7. The method of claim 5, further comprising:
   identifying each radio link of the mesh radio network; and
   generating a normalized routing score for each radio link of the mesh radio network.

8. The method of claim 7, further comprising:
   identifying each pair of nodes within the mesh radio network having a radio link; and
   identifying a physical distance between each identified pair of nodes.

9. The method of claim 8, further comprising:
   generating a scored routing graph based on:
   [a] the normalized routing score for each radio link of the mesh radio network and
   [b] the identified physical distance between each identified pair of nodes.

10. The method of claim 5, wherein:
    generating the Internet communication routing table further includes determining one or more whitelisted radio nodes within the mesh of radio nodes,
    the one or more whitelisted nodes satisfy a whitelist performance threshold, and
    identifying the optimal communications routing path for the Internet communications request or the Internet communications response is based on the one or more whitelisted nodes.

11. The method of claim 5, wherein:
generating the Internet communication routing table further includes using a maximum/minimum algorithm to compute optimal routing paths for Internet communications data originating from or sourced to each radio node within the mesh radio network, and
the maximum/minimum algorithm identifies the optimal routing path based on maximum available bandwidths along routes and minimum total routing distances between sources of communications and destinations of communications within the mesh radio network.

12. The method of claim 5, further comprising:
transmitting the Internet communication request or the Internet communication response according to the selected communications routing path;
augmenting the transmission with an up-to-date Internet communication routing table.

13. The method of claim 5, further comprising:
transmitting the Internet communication request or the Internet communication response according to the selected communications routing path;
augmenting the transmission with the selected communications routing path.

14. The method of claim 5, wherein:
identifying operational attributes of the mesh radio network includes collecting operational attributes of the mesh radio network in one of an active mode and a passive mode,
the passive mode includes acquiring operational attributes data as the one or more of the plurality of networked radio communication devices provide operational attributes data to the central routing server, and
the active mode includes acquiring operational attributes of the mesh radio network based on applying test loads during a test period to the mesh radio network and collecting operational attributes of the mesh network during the test period.

15. The method of claim 14, wherein
the operational attributes of each of the radio communications devices includes an offline/online status of each of the radio communication devices within the mesh radio network, wherein a default offline status is assigned to radio communication devices that fail to provide an affirmative offline/online status.

16. The method of claim 5, wherein
identifying operational attributes of the mesh radio network includes collecting operational attributes of each active radio link between disparate pairs of radio nodes within the mesh radio network.

17. The method 18, wherein
collecting operational attributes of each active radio link includes collecting an available bandwidth of each active radio link.

18. The method of claim 5, wherein
identifying operational attributes of the mesh radio network includes collecting operational attributes of each of the radio communication devices within the mesh radio network.

19. The system of claim 1, wherein generating the Internet communication routing table includes:
simulating an Internet communications data load to an optimal communications routing path within the mesh radio network, and
in response to the simulation, dispersing two or more Internet communications within the mesh radio network to the optimal communications routing path and to a sub-optimal communications routing path.

20. A method for routing Internet communications data within a mesh network of radio communication devices, the system comprising:
identifying operational attributes of the mesh radio network;
identifying an Internet communication request originating from at least one of the plurality of network communication devices or identifying an Internet communication response originating from the one or more Internet sources;
generating an Internet communication routing table for the mesh radio network;
transmitting the Internet communication routing table to the mesh radio network; and
in response to identifying the Internet communication requests, selecting an optimal communications routing path for the Internet communication request or the Internet communication response based on the Internet communication routing table;
wherein:
identifying operational attributes of the mesh radio network includes collecting operational attributes of the mesh radio network in one of an active mode and a passive mode,
the passive mode includes acquiring operational attributes data as the one or more of the plurality of networked radio communication devices provide operational attributes data to the central routing server, and
the active mode includes acquiring operational attributes of the mesh radio network based on applying test loads during a test period to the mesh radio network and collecting operational attributes of the mesh network during the test period.

* * * * *